United States Patent [19]

Butler

[11] Patent Number: 4,613,143

[45] Date of Patent: Sep. 23, 1986

[54] DUAL-LIP SHAFT SEAL WITH ONE SPRING-URGED LIP

[75] Inventor: John D. Butler, Van Wert, Ohio

[73] Assignee: Federal-Mogul Corporation, Southfield, Mich.

[21] Appl. No.: 803,702

[22] Filed: Dec. 2, 1985

Related U.S. Application Data

[62] Division of Ser. No. 598,857, Apr. 11, 1984, Pat. No. 4,578,856.

[51] Int. Cl.[4] .............................................. F16J 15/32
[52] U.S. Cl. .................................... 277/134; 277/153; 277/166
[58] Field of Search ............ 277/153, 154, 1, 133–135, 277/166

[56] References Cited

U.S. PATENT DOCUMENTS 3,857,156  12/1974  Clark ............................... 277/134 X
4,464,322  8/1984  Butler ............................. 277/153 X

FOREIGN PATENT DOCUMENTS 2736207  2/1979  Fed. Rep. of Germany ...... 277/134
1437899  3/1966  France .................................. 277/134
56-150663  11/1981  Japan ................................... 277/134

Primary Examiner—Robert S. Ward
Attorney, Agent, or Firm—Lawrence J. Shurupoff; Robert F. Hess

[57] ABSTRACT

A dual-lip shaft seal with two PTFE sealing members bonded to a molded elastomeric body, and a method and mold for its manufacture includes an elastomeric body bonded to the radial flange of a metal case and provides (1) a shaped lip with a garter spring held in a recess and, bonded to its other side, a frustoconical PTFE ring providing its sealing lip portion and (2) an inflexible portion bonded to a radially extending PTFE wafer.

8 Claims, 16 Drawing Figures

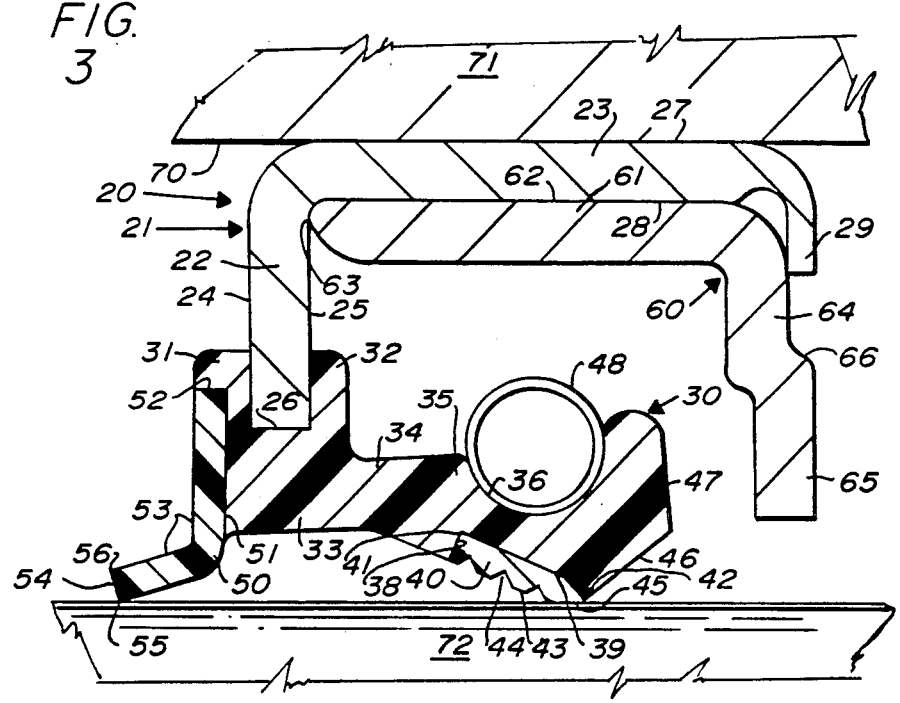
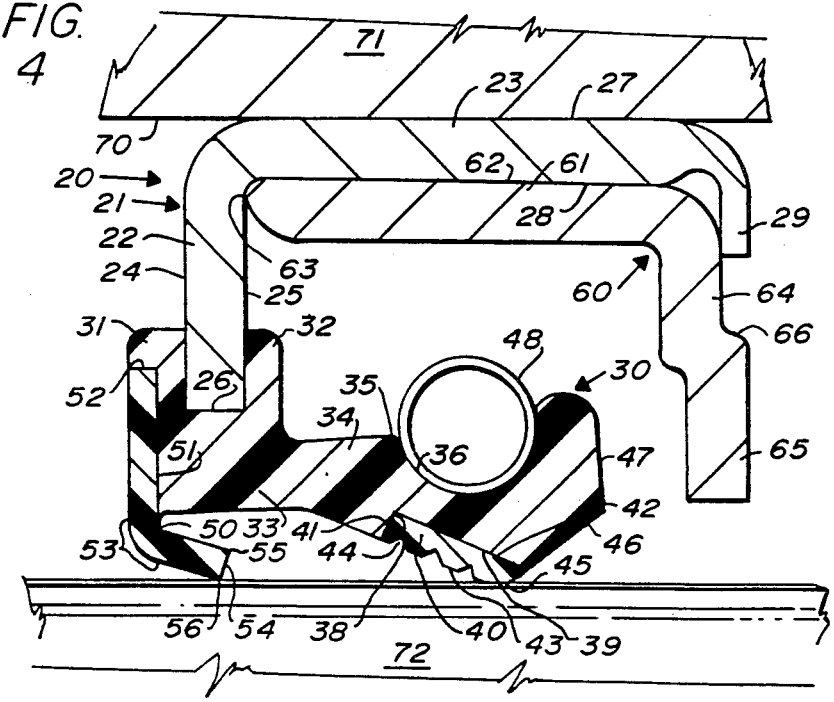

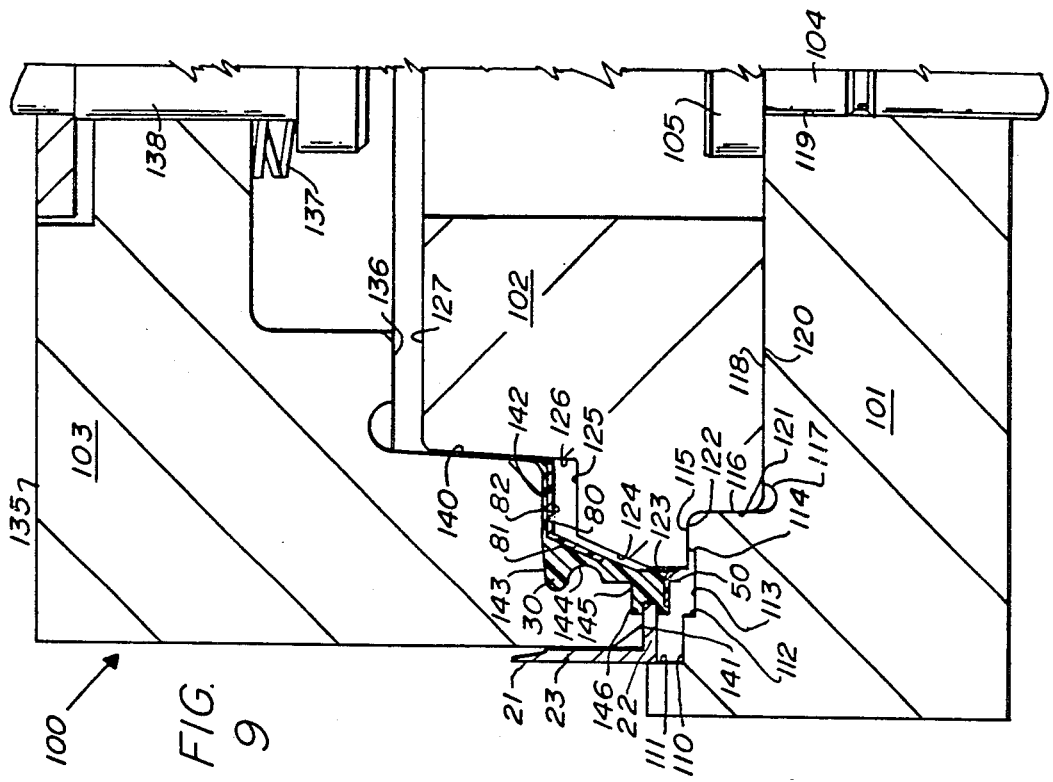
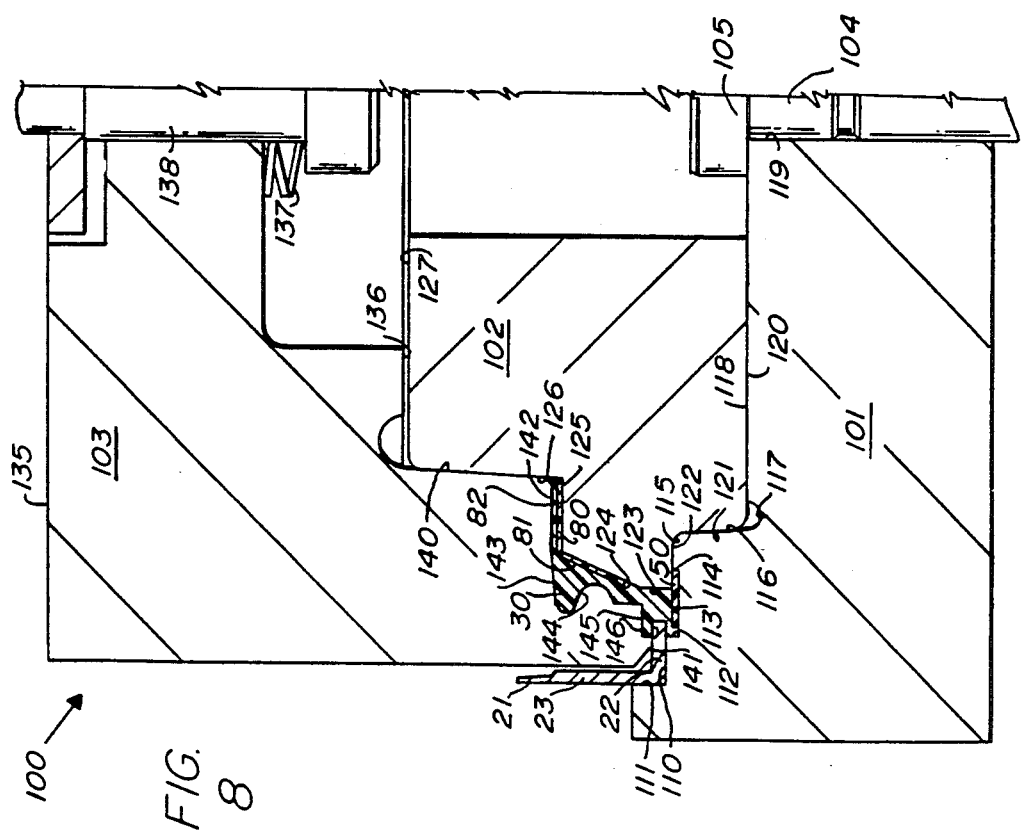

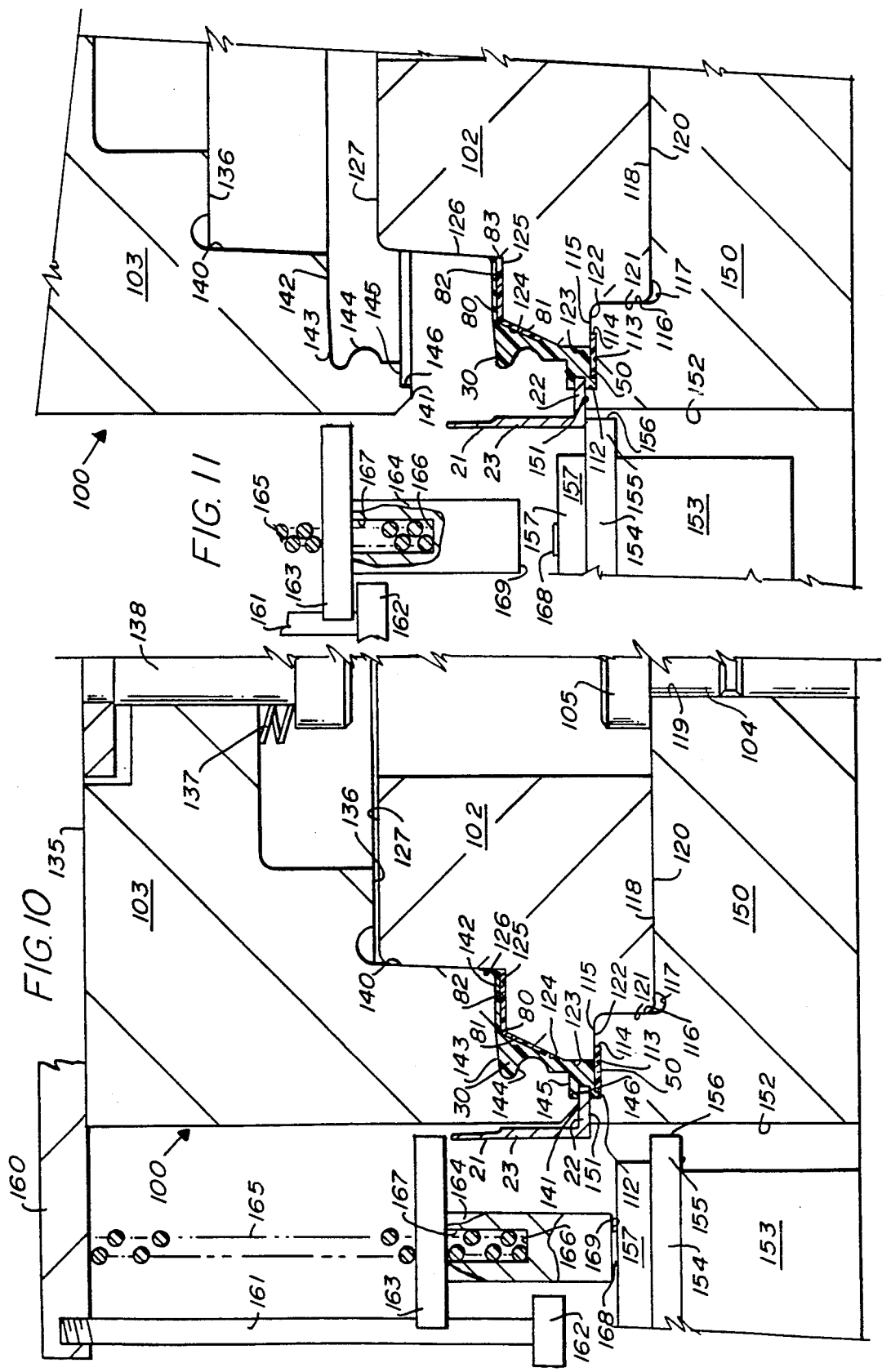

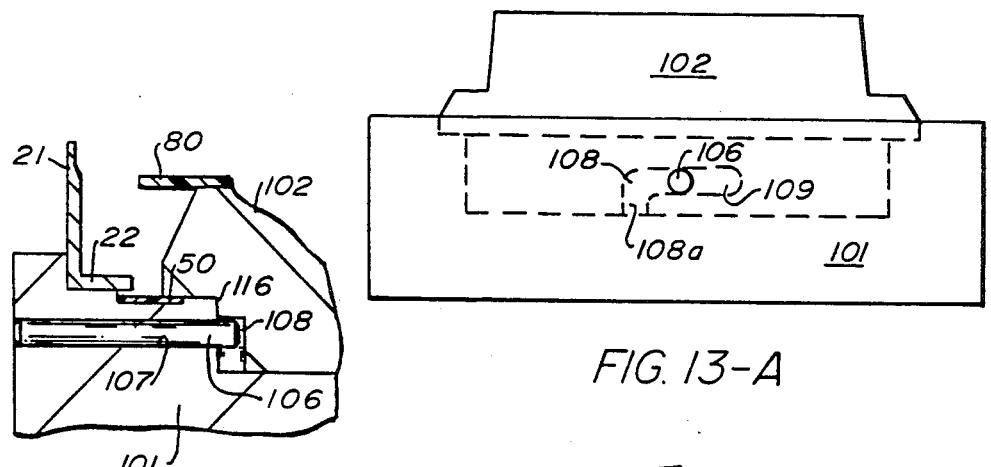
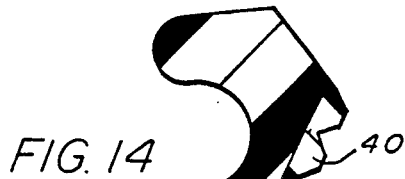
FIG. 13
FIG. 13-A
FIG. 14
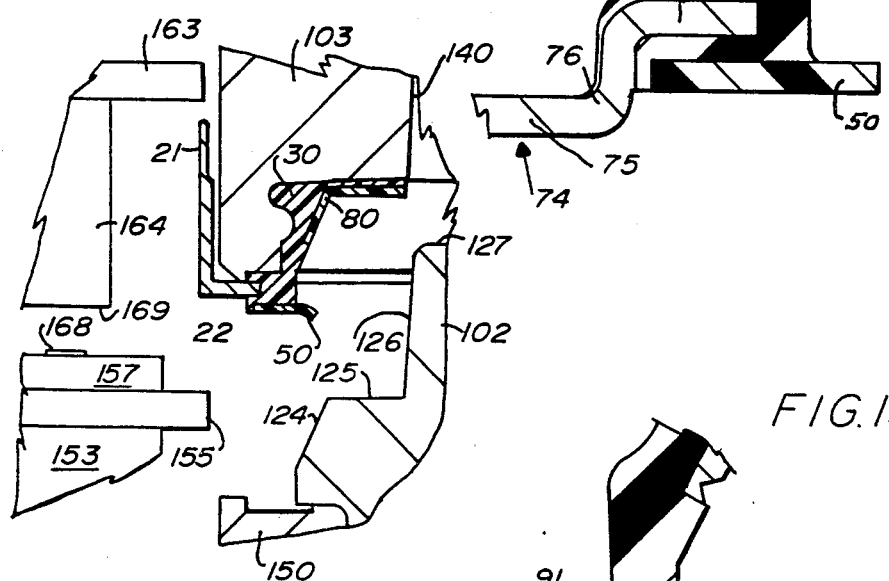
FIG. 12
FIG. 15
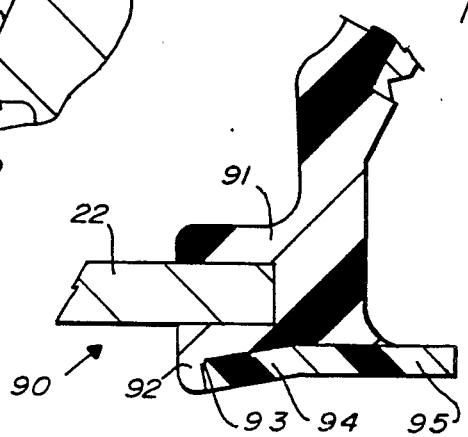

DUAL-LIP SHAFT SEAL WITH ONE SPRING-URGED LIP

This is a division of application Ser. No. 598,857 filed Apr. 11, 1984, now U.S. Pat. No. 4,578,856.

This invention relates to an improved dual-lip shaft seal of the type having an elastomeric body bonded to a metal case and in which the actual contacting surfaces of the lips are made from polytetrafluoroethylene, a method for making the seal, and a mold for practicing the method.

BACKGROUND OF THE INVENTION

There are already in existence various types of polytetrafluoroethylene seals and also various types of dual lip seals, some of which use polytetrafluoroethylene for at least one of the lips. However, most of these rely on clamping a polytetrafluoroethylene washer or wafer into a case, and those that do involve some bonding, usually bond only a single-lip seal. Clamping always involves the possibility of leakage and also involves a somewhat expensive assembly operation. That type of assembly operation can be eliminated when the entire seal is molded in a single operation. A molded seal can easily be assembled into a unitized seal or used without unitization, depending on which would be preferable for a particular use.

An important difficulty in the way of providing such a bonded dual-lip seal with polytetrafluoroethylene sealing edges, is that heretofore no economical process for achieving this molding has been provided. This is particularly true when the seal is to have one lip that is spring urged while the other lip is a wafer-type lip. The present invention makes this one-step molding possible.

Thus, it is an object of the present invention to provide a unitary molded dual-lip seal having polytetrafluoroethylene bonded to an elastomer and serving as the sealing surface for both lips.

Another object of the invention is to provide a practical method for making such a dual lip type of seal.

SUMMARY OF THE INVENTION

The product of this invention is a dual-lip shaft seal with two polytetrafluoroethylene sealing members bonded to a molded elastomer body. The shaft seal may have a metal case with a bore-contacting cylindrical portion and a radially inwardly extending flange having an inner end. A relatively inflexible portion of an elastomeric member is bonded to at least the inner portion of the flange on both sides thereof and on the inner end. This elastomeric member includes a shaped lip body connected to the inflexible portion by a flexing diaphragm portion. The lip body generally has a spring-receiving recess on its radially outer side and on its radially inner side has a frustoconical recess leading radially inwardly from a shoulder adjacent to the flexing diaphragm portion. There is also a frustoconical portion meeting the frustoconical recess at an angle and extending radially outwardly to an outboard end of the lip body. After molding and trimming have been completed, a garter spring is seated in the spring-receiving recess, if there is one.

A frustonical ring of polytetrafluoroethylene fills the frustoconical recess of the lip body and is bonded to the shoulder and to the full length of the lip body along that frustoconical recess. This ring provides the lubricant sealing portion of the spring-urged sealing lip.

There is also a radially extending polytetrafluoroethylene washer bonded on one side to the relatively inflexible body portion on the opposite side of the radial flange from the spring-urged lip. This washer extends in radially, before installation, and upon installation is flexed to provide a dirt-excluding lip.

The invention also includes a method for making the dual-lip shaft seal.

An annular metal case is placed on a base mold member, a radial flange of the case being seated on a first annular ledge of the base mold member. The case extends radially inwardly beyond the inner end of this first ledge, which ends at a first shoulder dropping to a second annular ledge. As a result, the lower face of the inner portion of the case flange is left exposed.

Either before or after the case is thus seated, a first flat polytetrafluoroethylene washer is seated with its lower face on the second ledge and its inner circular end abutting a raised second shoulder. This second shoulder is shallower or shorter than the first shoulder and leads up to a third annular ledge that is flush with the upper face of the washer. The outer circular end of this first washer is spaced in from the first shoulder, which is axially spaced away from the radial flange. The washer does not touch the case's radial flange, but is spaced axially away from it.

When the case and the first washer are seated, a lower annular radial face of a movable intermediate mold member is closed down on top of, and in engagement with, the third ledge, this lower face extending out over and in engagement with the upper face of the first washer to exclude elastomer from an inner lip portion thereof. This intermediate mold member is then locked in place. It has a vertical cylindrical portion extending up from the inner end of its lower face and a sloping frustoconical portion extending upwardly and radially inwardly from an upper end of the vertical cylindrical portion to an upper ledge that terminates at a generally vertical tapered portion.

A second polytetrafluoroethylene washer is placed on this upper ledge, its inner periphery abutting the tapered portion, while an outer portion extends out beyond the outer edge of the upper ledge and overhangs the frustoconical portion.

A ring of uncured elastomer is then placed on top of the portion of the second washer which rests on the upper ledge, so that the actual molding can proceed. All the mold parts are, of course, heated to enhance flow of the elastomer and also to effect curing while the mold is kept closed.

The mold is closed by bringing an upper mold member down toward the base and intermediate mold members. This movement forces the uncured elastomer to flow outwardly and downwardly and to force the overhanging portion of the second polytetrafluoroethylene washer against the frustoconical portion of the intermediate mold member, while bonding the elastomer to that second washer. It also forces a radially outer radial portion of the upper mold member to engage the outer portion of the case's radial flange and thereby to entrap the elastomer within the mold. Mold closure causes a shaped portion of the upper mold member to provide a radially outer seal body portion opposite the frustoconical portion of the intermediate mold member and, when desired, to define a garter-spring-receiving recess there, while also providing a seal diaphragm portion between the seal body portion and the case's radial flange. This mold closure also defines a recess radially inward from the outer radial portion of the upper mold member, and this recess enables the elastomer to flow into it and to achieve bonding of the elastomer to that side of the radial flange. The elastomer also flows around the inner end of the flange to the opposite side of the flange and achieves bonding there to the case and to the upper face and outer edge of the first washer, flowing between the washer's outer edge and the first shoulder.

The upper ledge and the frustoconical portion of the intermediate mold member may be provided with a serrated or threaded surface to impart a serrated or threaded surface to the second washer.

The elastomer is cured under heat and pressure, while completing its bonding to the case and to the fluorocarbon washers. Then the mold is opened by raising the upper mold member. This raising will, with some structures, strip the seal from the lower member and the intermediate mold member; with other structures, an external stripper is used.

After the molded product is withdrawn from the mold and cooled, the seal body portion of the product is trimmed, as by a knife, to provide a frustoconical edge and a lubricant-sealing lip vertex across the sloping portion of the second washer, this edge also defining a frustoconical surface of the seal body. The seal may then be completed by inserting a garter spring in the garter-spring-receiving recess, if there is such a recess.

BRIEF DESCRIPTION OF THE DRAWINGS

FIG. 3 is a similar view in section on the scale of FIG. 2 of the seal combined with a second case element and installed between a shaft and a housing, the installation being made from the left.

FIG. 4 is a view similar to FIG. 3 showing the seal as it appears when installed from from the right.

FIG. 8 is a view like FIGS. 5 and 6 of the mold in its fully closed position with the molding being down.

FIG. 9 is a view like FIG. 8 showing the mold being opened after curing.

FIG. 10 is a view similar to FIG. 8 of a modified form of mold.

FIG. 11 is a view similar to FIG. 10 showing the mold of FIG. 10 being opened and the seal, having stayed with the lower mold member, about to be ejected.

FIG. 12 is a fragmentary view similar to FIG. 11 showing the seal, having stayed with the upper mold member, being stripped therefrom.

FIG. 13 is a view similar to FIGS. 8–11 taken at a different rotational position and showing one of the mechanisms for locking the base mold member and intermediate mold member together.

FIG. 13A is a view in side elevation on a reduced scale of the base and intermediate mold members, showing the locking members of FIG. 13.

FIG. 14 is a view like FIG. 2 of a modified form of seal embodying the principles of the invention.

FIG. 15 is a similar view of another modified form of the invention.

DESCRIPTION OF SOME PREFERRED EMBODIMENTS

Figure 1:
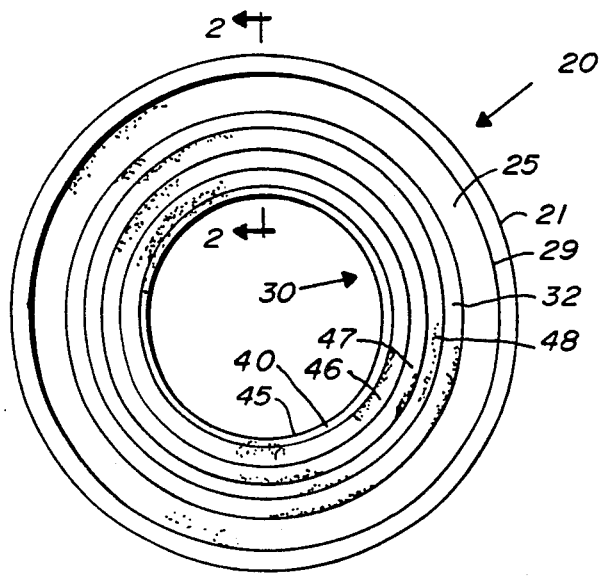
FIG. 1 is a view in end elevation of a seal embodying the principles of the invention.
Figure 2:
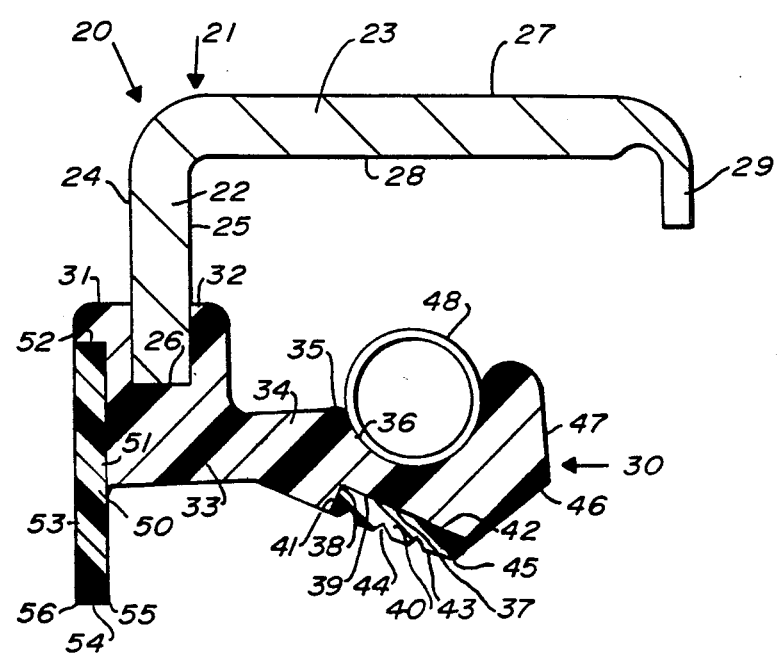
FIG. 2 is an enlarged view in section taken along the line 2—2 of FIG. 1.

As shown in FIGS. 1 and 2 a dual lip shaft seal 20 embodying the invention includes a metal case member 21 having a radial flange 22 and a cylindrical-bore engaging portion 23. The radial flange 22 has an air-facing surface 24, an oil-facing surface 25, and a radially inner cylindrical end 26. The bore-engaging portion 23 has an outer, bore-engaging surface 27, an inner surface 28 and a free end 29.

Bonded to the inner part of the radial flange 22 is an elastomeric member 30, which is relatively inflexible at its portions 31 and 32 that are bonded to the flange surfaces 24 and 25 and at an inner portion 33 that is bonded at the end edge 26, thereby providing a firm anchor for the elastomeric member 30. A flexing diaphragm portion 34 leads to a lip body 35 preferably having a spring-receiving recess 36 on its radially outer side, and having on its radially inner side a frustoconical recess 37 with a shoulder 38 and a long frusoconical wall 39.

A polytetrafluoroethylene annulus 40 is bonded to the shoulder 38 and the wall 39 of the recess 37 by its end edge 41 and its radially outer face 42. The washer's radially inner surface 43 provides the air side of the sealing lip structure, and this polytetrafluoroethylene surface preferably has a series of flutes 44 to provide hydrodynamic action. These flutes 44 may preferably comprise a triple-entry screw thread, but they may be a single-entry, double-entry, or some other form of plural-entry screw thread, Contact with the shaft is made by a lip edge 45.

The body 35 is also provided, during trimming, with a radially outwardly extending frustoconical surface 46 extending from the seal lip edge 45 to an end radial wall 47 of the body 35. In the finished seal there is, of course, a garter spring 48 in the spring-receiving recess 36 when the recess is present.

On the opposite side of the case's radial flange 22 from the lip body 35, a tetrafluoroethylene wafer or washer 50 is bonded to the elastomer and extends radially in. If desired it may be formed to extend axially outwardly at an angle, but normally it is a simple radial wafer. This wafer 50 is also bonded on a portion of one surface 51 and at its radially outer end edge 52 to the relatively inflexible elastomeric body 33. The wafer 50 has an elastomer-free radial surface 53 and an inner periphery 54, with edges 55 and 56. When the wafer 50 is flexed outwardly (FIG. 3), the edge 55 engages the shaft. When the wafer 50 is flexed inwardly (FIG. 4) the edge 56 engages the shaft.

Due to the flexibility of the polytetrafluoroethylene wafer 50, and also due to the flexibility of the flexing portion 34, the lubricant-retaining lip 45 and the dirt-excluding lip 50 are able to act quite independently.

FIGS. 3 and 4 show the seal 20 completed and installed in two different types of installation.

The seal 20 has, in these figures, been provided with an inner case member 60 having a cylindrical portion 61 nested with its outer surface 62 against the inner surface 28 of the case member 21 and its free end 63 engaging the radial flange 22. The case member 60 also has a stepped radial flange with a radially outer portion 64 and a radially inner portion 65 joined by a step 66. The free end 29 of the outer case member 21 is curled over to engage the outer radial flange portion 64 and to clamp the two case members 21 and 60 tightly together.

The outer surface 27 of the outer case member 21 engages a bore wall 70 of a housing 71. The lip edge 45, somewhat flattened, engages the rotating shaft 72. The oil side of the seal in both FIGS. 3 and 4 is to the right and air side to the left.

In FIG. 3 the seal 20 is installed from left to right, so that the edge 55 of the outwardly flexed dirt excluding lip 50 engages the shaft 72. In FIG. 4, the seal 20 is installed from the right to the left, so that the edge 56 engages the shaft 72, and the lip 50 is flexed inwardly.

A modified form of the invention is shown in Fig. 14. Here, a seal 74 generally resembles the seal 20, but its case has its radial flange 75 turned in axially at 76 and then provides a radial portion 77 to which an elastomeric body 78 is bonded. The body 78 is basically like the body 30, and the two polytetrafluoroethylene annuli 40 and 50 are bonded to it. The function of the seal 74 is basically like that of the seal 20; but it meets an interesting situation that is sometimes encountered.

In seal manufacture, the seal is often transported by a conveyor belt, either within the factory or at the place where it is to be installed or both. If the lip portion of the washer 50 were to rest on the conveyor belt, it could become contaminated or damaged. The axial inset of the seal 74 prevents this.

Another solution to the same problem is shown in FIG. 15. Here, a seal 90 is made with the flange 22 as in the seal 20, but a body 91, which in most ways is like the body 30, has a protective portion 92 with an angular face 93 to which a washer 94 (like the washer 50) is bonded. An angular portion 95 of the washer 94 follows the face 93 and extends in at about 10° to assure that the radial portion 95 lies axially away from the plane of such a conveyor belt.

The method for making the seal 20 is shown in FIGS. 5 through 11. A mold 100 (see FIG. 8) includes a base mold member 101, an intermediate mold member 102 and an upper mold member 103, all of which may be installed in a conventional compression molding press (not shown). The base mold member 101 is locked there, as by a mold pin 104 having a head 105. A somewhat unusual feature of the mold 100 is that the intermediate mold member 102 is removable, to enable placement of the polytetrafluoroethylene member 50. When that member 50 is in place on the base mold member 101, the intermediate mold member 102 is put in place, and, as shown in FIGS. 13 and 13A, is locked to the base mold member 101. This may be done by a pair of diametrically opposite pins 106 that each extend through one of a pair of diametrically opposite openings 107 through the base member 101 into a recess 108 in the intermediate mold member 102. The recess 108 has a vertical entry portion 108a, as shown in FIG. 13A, and a circumferential segment for arcuate portion 109 which is cammed upwardly. Each pin 106, which may be permanently retained in place in its opening 107 by press fit, projects beyond the inner periphery 116. When the mold part 102 is set in place, care is taken that the projecting portion of the pin 106 engages the vertical portion 108a of the recess 108. Then when the mold part 102 is fully seated in the base member 101, the mold part 102 is rotated, so that the pins 106 are engaged in their locking portions 109. The camming determines the final rotational position and assures that the mold parts 101 are locked firmly together. Unlocking is achieved by reverse rotation of the member 102, and when the pin 106 is again in the recess portion 108a, the member 102 may be lifted out. The internal pressure exerted by the prep at mold closure is not only sufficient to hold the wafer 50 in place but is also sufficient to clamp the members 101 and 102 together and to preclude flash from extending in between them.

Figure 5:
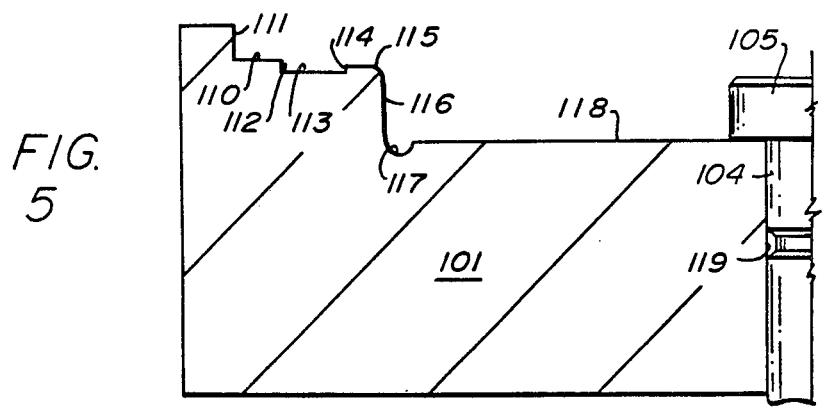
FIG. 5 is a view in elevation and in section of about one half of an annular base mold member used in making the seal in a method embodying the principles of the invention.

A shown in FIG. 5 the base molding member 101 has a first radial ledge 110, which may lead in from a radially outer cylindrical shoulder 111. This ledge 110 terminates at a first step 112 leading down to a second ledge 113 which ends at an upwardly directed step 114 leading to a third ledge 115. The third ledge 115 leads via a curved corner to an annular generally cylindrical portion 116 that goes down into a flash-receiving recess 117, from which a fourth ledge 118 extends radially inwardly to an inner periphery 119, and the head 105 bears against the ledge 118.

Figure 6:
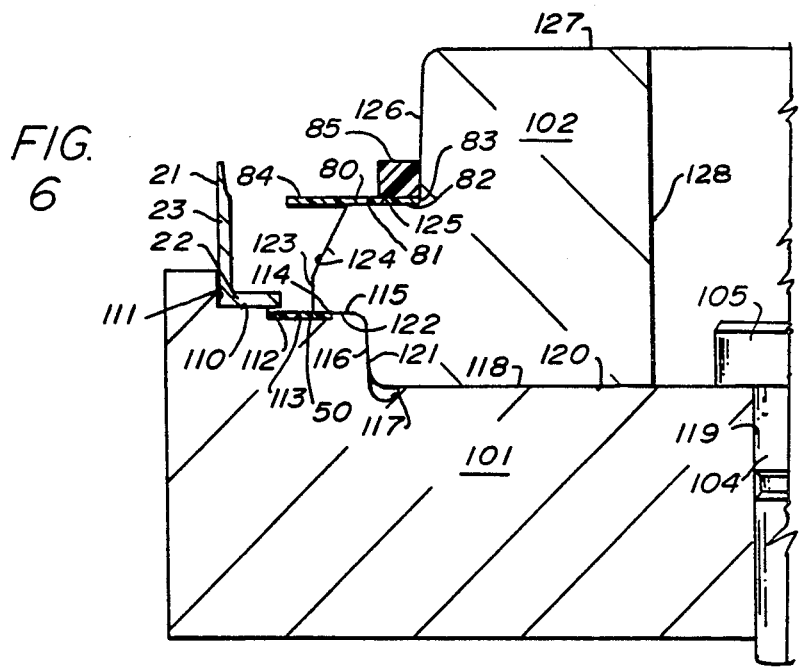
FIG. 6 is a view like FIG. 5 of the mold at a second stage of the operation, with the case member and the dirt-excluding washer in place and an intermediate mold member locked in place and the second washer and uncured elastomer set in place on that mold member. The mold is still open.

As shown in FIG. 6, the case 21 is placed with bore-engaging portion 23 against the cylindrical shoulder 111 and its radial flange 22 seated on the first ledge 110. The flange 22 extends in beyond the inner end of the first ledge 110 and hangs over and is spaced from the second ledge 113. Upon the second ledge 113 and against the second step 114 is inserted the annular polytetrafluoroethylene member 50. The base mold member 101 is sized in relation to the member 50 so that the third ledge 115 is flush with the surface 51 (FIG. 2) of the member 50, the second step 114 being as close as possible the thickness of the polytetrafluoroethylene washer 50 to be used. The outer periphery 52 (FIG. 2) of the member 50 is spaced in from the first step 112 (FIG. 6), and the surface 51 of the washer 50 is spaced away from the scraper 24 of the radial flange 22.

When these two members 21 and 50 are in place, the next step is to install the intermediate mold member 102 (FIG. 6) and lock it in place with its tee lock member 106. The mold member 102 has a lowermost surface 120 that engages the fourth ledge 118 and a substantially vertical surface 121 that engages the cylindrical portion 116 of the base mold member 101. It also has a lower face 122 which engages the third ledge 115 and extends radially outwardly beyond the step 114 to rest upon and engage a radially inner annular portion of the surface 51 of the polytetrafluoroethylene member 50, helping to prevent elastomeric flash from attaching to this portion of the surface 51. Also, when the surface 122 is in place, the polytetrafluoroethylene member 50 is held down firmly on the base member 101 by the internal mold pressure of the prep 85.

The intermediate mold member 102 also has a generally cylindrical vertical portion 123 of the mold cavity, leading up to a frustoconical surface 124 that extends radially inwardly as well as axially upwardly to an upper ledge 125. The upper ledge 125 extends radially inwardly to a tapered mold wall 126 that extends up generally vertically to an uppermost surface 127. An inner annular planar wall 128 joins the surface 127 to the surface 120.

Figure 7:
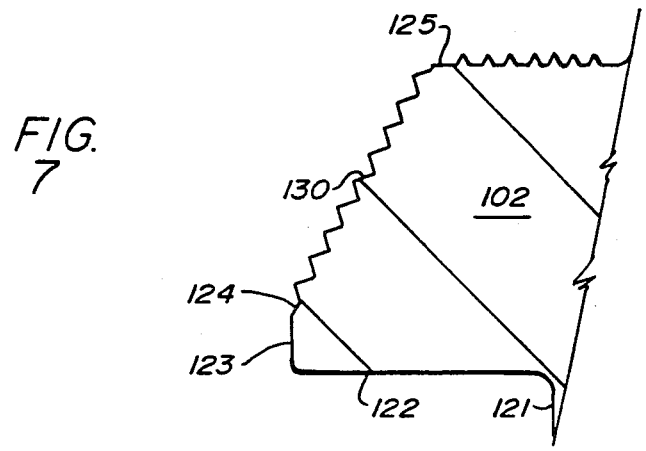
FIG. 7 is an enlarged fragmentary view in section of a portion of the intermediate mold member showing its upper ledge and frustoconical portion.

With the mold in the position of FIG. 6, a second polytetrafluoroethylene washer 80 is placed on the upper ledge 125. The washer 80 will eventually provide the sealing member 40, and it may have the hydrodynamic threads 44 on at least a portion of its lower surface 81. However, as shown in FIG. 7, the upper ledge 125 and the frustoconical surface 124 may be provided with the desired pattern of screw threads 130 for imparting the serrations or threads 44 to the polytetrafluoroethylene member 80 during the molding and curing operation, which is carried out at elevated temperatures and under considerable pressure.

Both polytetrafluoroethylene washers 50 and 80 are provided on their to-be-bonded surfaces 51 and 82, with a bondable surface and with mold cement. Thus, it may be advisable to acid-etch the upper face 51 of the first washer 50 and to acid-etch the upper surface 82 of the second washer 80, and then to apply to each of these a suitable bonding cement. The second washer 80 seats with an inner portion of its lower surface 81, on the upper ledge 125 with its inner periphery 83 against the bottom portion of the tapered wall 126, and with a radially outer portion 84 extending out well byond the radially outer extremityof the ledge 125 and overlying the frustoconical portion 124. the overhanging portion 84 should be somewhat shorter than the frustoconical portion 124.

A ring 85 of "prep", (uncured elastomer) is then placed on top of the radially inner portion polytetrafluoroethylene washer 80, preferably not extending beyond the radially outer edgeof the upper ledge 125.

The upper mold member 103 (see FIG. 8) is the one that closes the mold 100, due to pressure exerted on its uppermost surface 135 by the mold press, and in doing so achieves many functions. All of the mold members 101, 102, and 103 are heated to a temperature suitable for molding, so that mold closure causes the elastomer 85 to flow. The polytetrafluoroethylene members 50 and 80, of course, do not flow at this temperature. The elastomer primarily used at present is a silicone compound which is particularly suitable for internal combustion engine front and rear crank shaft applications. Other elastomers, including the many other kinds of synthetics known for oil seal applications are also suitable, dependent upon the particular application or use intended.

The upper mold member 103 has a surface 136 which engages the uppermost surface 127 of the intermediate mold member 102, and a spring 137 between the mold member 103 and a molding pin 138, which enables the mold 100 to close quite tightly. The upper mold member 103 has a tapered portion 140 that engages the tapered wall 126 of the intermediate mold member 102, and the mold member 103 also has a radially outwardly located annular surface 141, which comes down and bears against the radially outer oil facing surface 25 of the radial flange 22. The surface 141 seats early and actually may indent the flange 22 a small amount, thereby closing the mold 100 so that the elastomer 85 cannot flow out of the mold.

The upper mold member 103 is shaped to provide much of the mold cavity. A generally radially extending portion 142 overlies the upper ledge 125 of the intermediate mold member 102 and leads out radially to a surface 143, not quite radial but nearly so, which provides the end wall 47 of the lip body 35. The surface 143 leads to a shaped mold portion 144 providing the outer surface of the lip body 35 including the spring-receiving groove 36. the portion 144 also defines the outer side of the diaphragm 34 and leads to a radial portion 145 that goes to the shoulder 146 that goes to the case-engaging surface 141. Between the portion 145 and the case flange 22 is the mold cavity portion defining the relatively inflexible portion 35 of the elastomer that will be bonded to the surface 25 of the flange 22, which has also been properly prepared and provided with bonding cement.

As will be seen from the drawings, the closure of the mold 100 prevents escape of the elastomer 85, and the shapes of the mold members 101, 102, and 103 provide the mold cavity. The elastomer 85 flows until it bonds to both sides 24 and 25 and the inner periphery 26 of the cases's radial flange 22, and also to the outer periphery of the lower or first polytetrafluoroethylene washer 50 as well as to a large portion of its upper surface 51.

The action of the mold 100 on the elastomeric member 85 not only causes it to flow, but also causes it to deform the upper or second polytetrafluoroethylene washer 80, to force it against the frustoconical surface 124 of the intermediate mold member 101 and to bond its surfaces 41 and 42 to the elastomer.

After cure has been completed, the upper mold section 103 is raised, normally carrying the seal 10 with it, as shown in FIG. 9, primarily because of the mold member 103 retaining the lip body 35 by engaging the groove 36. The resulting molded element is then removed from the upper mold member 103. Later, it is trimmed to the shape shown in FIG. 1, typically by a knife structure on a rotating lathe, the seal body 35 being cut at the angle indicated.

If the groove 36 for the spring is shallow so that upward movement of the mold member 103 will not strip the seal from the intermediate member 102, then mold structure like that shown in FIGS. 10 and 11 may be used. Here, a modified form of base mold member 150 is used in place of the member 103. The base mold member 150 is like that of the member 103 except that it lacks the portion providing the outer shoulder 111 and has a narrower first ledge 151. Instead, there is a cylindrical surface 152 at the outer edge of the ledge 151. The case 21 rests on the ledge 151 above and extends out beyond it and beyond the surface 152.

An annular ejector member 153 surrounds the surface 152 of the base mold member 150. On its upper surface rests an ejector portion 154 having an inner portion 155 with an inner periphery 156, which is spaced radially outwardly from the surface 152 but is radially inward from the cylindrical portion 23 of the case 21. Atop the ejector member 154 is a hold-down member 157.

When the mold is closed, the entire ejector assembly 153, 154, 157 lies below the ledge 151 (FIG. 10). When the mold is opened (FIG. 11), the upper mold member 103 is unable to carry the seal with it, but then the ejector 153 moves upwardly under pneumatic pressure by conventional means, (not shown), and the inner portion 155 of the ejector portion 154 engages the radial flange 22 and its further upward movement (not shown) strips the seal from the mold members 150 and 102.

As shown best in FIGS. 10–12, the mold 100 may also include a stripper mechanism. To a press plate 160 is secured a vertical tie down bolt 161 having a lower head 162. Slidably mounted on the tie down bolt 161 is a stripper plate 163 having a downwardly extending spring-locator boss 164. The ejector hold-down member 157 is provided with a "kiss" plate or button 168. As the press plate 160 brings the upper mold member 103 down, the lower end 169 of the boss 164 engages the kiss plate 168, so that the downward movement of the boss 164 and the stripper plate is ended while the ball 161 slides down further. Once the mold 100 is opened, the force of the spring 165 holds the boss 164 down against the ejector hold down member 157, so that upward movement of the seal 20 brings the case end 21 against the stripper plate 163 and strips the seal 20 from the upper mold 103, as shown in FIG. 12. Thus, if the seal stays with the lower mold member, it is ejected as in FIG. 11; if it stays with the upper mold member, it is stripped as in FIG. 2.

After ejection or stripping, the mold member 102 may be rotated relative to the base mold member 101 to unlock the pin 106 from the cammed recess 109; then the mold member 102 may be lifted out.

To those skilled in the art to which this invention relates, many changes in construction and widely differing embodiments and applications of the invention will suggest themselves without departing from the spirit and scope of the invention. The disclosures and the descriptions herein are purely illustrative and are not intended to be in any sense limiting. For example, while only a garter spring biased main seal lip has been shown and described, it is quite possible that for certain applications the garter spring and garter spring recess can be eliminated and that the polytetrafluoroethylene annulus 40 will be itself exert sufficient shaft retention force to keep the seal lip portion 45 in full and constant engagement with the shaft.

What is claimed is:

1. A dual-lip shaft seal with two polytetrafluoroethylene sealing members bonded to a molded elastomeric body, including in combination;
    a metal case having a radially inwardly extending flange with an inner end,
    an elastomeric member bonded to said flange and providing on one side thereof a shaped lip body with a frustoconical outwardly recessed wall on its radially inner side,
    a frustoconical ring of polytetrafluoroethylene bonded to said frustoconical recessed wall, and providing the actual sealing portion of its said lip, and
    a radially extending polytetrafluoroethylene washer bonded on one side to said elastomeric member on the opposite side of said radial flange from said lip body.

2. The shaft seal of claim 1 wherein said shaped lip body has a spring-receiving recess on its radially outer side, a garter spring in said spring-receiving recess.

3. The shaft seal of claim 1 wherein said washer is recessed axially inwardly from its adjacent axial end of said seal.

4. The shaft seal of claim 1 wherein said frustoconical ring is provided with hydrodynamic grooves on its radially inner face.

5. The shaft seal of claim 2 wherein said grooves comprises multi-lead screw threads.

6. A dual-lip shaft seal with two polytetrafluoroethylene sealing members bonded to a molded elastomeric body, including in combination;
    a metal case having a bore-contacting cylindrical portion and a radially inwardly extending flange with an inner end,
    an elastomeric member having a relatively inflexible portion bonded to at least the inner portion of said flange on both sides thereof and on the inner end and providing on one side thereof a shaped lip body connected to said inflexible portion by a flexing diaphragm portion, said lip body having a spring-receiving recess on the radially outer side of said lip body and on its radially inner side a frustoconical recess leading radially inwardly from a shoulder adjacent to said flexing diaphragm portion and a frustoconical portion meeting said frustoconical recess at an angle and extending radially outwardly to the outboard end of said lip body,
    a garter spring in said spring-receiving recess,
    a frustoconical ring of polytetrafluoroethylene in said frustoconical recess and bonded to said shoulder and for its full length to the full length of said frustoconical recess and providing the actual sealing portion of its said lip, and
    a radially extending polytetrafluoroethylene washer bonded on one side to said relatively inflexible body portion on the opposite side of said radial flange from said lip body and extending radially in therefrom.

7. The seal of claim 6 wherein said radially inwardly extending flange of said case is axially instepped at its radially inner portion and said relatively inflexible body portion is likewise radially instepped, so that said washer lies axially in from its adjacent end of the seal.

8. The seal of claim 6, wherein said relatively inflexible body portion has an angularly inclined axial end wall to which said washer is bonded, so that the inner free portion of said washer lies axially inwardly of said end wall.

* * * * *